July 13, 1954

F. B. ANDERSON
AUTOMATIC CONTROL OF AMPLIFICATION IN
LONE DISTANCE TRANSMISSION SYSTEMS
Filed March 27, 1952

2,683,777

INVENTOR
F. B. ANDERSON
BY
Ralph T. Holcomb
ATTORNEY

Patented July 13, 1954 2,683,777

UNITED STATES PATENT OFFICE 2,683,777

AUTOMATIC CONTROL OF AMPLIFICATION IN LONG DISTANCE TRANSMISSION SYSTEMS

Frithiof B. Anderson, Fanwood, N. J., assignor to Bell Telephone Laboratories, Incorporated, New York, N. Y., a corporation of New York Application March 27, 1952, Serial No. 278,978

19 Claims. (Cl. 179—171)

This invention relates to electrical signalling systems and more particularly to the automatic control of amplification in long distance transmission systems.

An object of the invention is to control automatically the gain of a signal amplifier in an electrical signalling system. Another object is to adjust automatically the gain of a repeater amplifier in a wire line transmission system to compensate for fluctuations in the line attenuation caused by temperature changes or other factors. Other objects are to reduce the size and cost of automatic transmission regulators. A further object is to improve the flatness and increase the range of regulation obtainable in a pilot-controlled regulator.

In electrical signalling systems such, for example, as those of the cable carrier type, the transmission loss varies due to temperature or humidity changes, because different lengths of transmission line are used between the amplifiers, or for other reasons. These loss variations may be compensated by means of a pilot-controlled feedback amplifier which has in its feedback path a regulating network including a thermo-responsive impedance element, or thermistor. A pilot wave of substantially constant average power, usually located at a frequency outside of the signal band, is transmitted over the line along with the signals. The pilot power and the signal power both vary in accordance with the variations in the line loss. The pilot power reaching the amplifier is utilized to vary the impedance of the thermistor, and therefore the feedback, to hold the change in gain of the amplifier nearly equal to the change in loss of the transmission line connected to its input, thus restoring the signal power to its initial value. However, if the power in the signal band is large compared to that of the pilot, the regulation is adversely affected because of time variation of the signals.

In accordance with the present invention, this interference with the regulation arising from the signal currents is reduced or eliminated by the inclusion of frequency-selective networks in the feedback path of the amplifier. In the embodiment shown, a predistorter is connected ahead of the regulating network and a restorer on the output side thereof. The predistorter preferably has a transmission characteristic which freely passes the pilot frequency but discriminates against the signal band, and the restorer has a transmission characteristic substantially complementary to that of the predistorter. The filtering effect of the predistorter greatly reduces the signal band power entering the thermistor, and correspondingly decreases the effects on the regulating action of variations of this power. The impedances presented to the regulating network by the predistorter and the restorer are preferably constant resistances. As the maximum power output capability of an amplifier of this type is reduced, the impedance presented to the thermistor is generally increased. This may lead to a decrease in both the flatness and the permissible range of regulation. In accordance with another feature of the invention, an impedance transformation is introduced into the predistorter to permit the use of an amplifier of lower power without adversely affecting either the flatness or the range of regulation. In order to avoid undesired reflections, an impedance-correcting network may be associated with the output of the amplifier, if required.

The nature of the invention and its various objects, features, and advantages will appear more fully in the following detailed description of typical embodiments illustrated in the accompanying drawings, of which:

Figure 1:
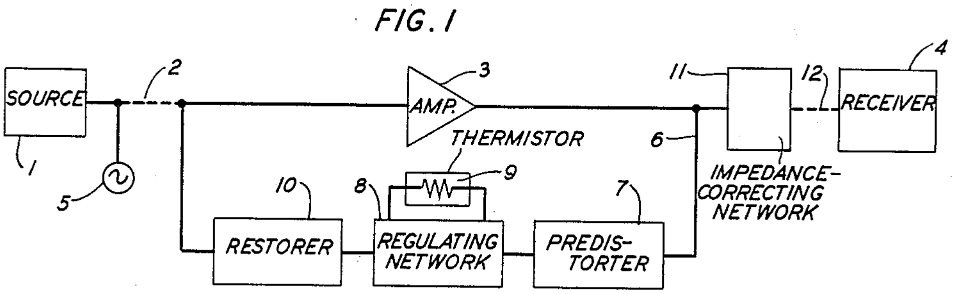
Fig. 1 is a single-line, block diagram of a signal transmission system embodying a transmission regulator in accord with the invention.

Taking up the figures in greater detail, Fig. 1 shows a signal transmission system in which signal currents from a source 1 are transmitted along a transmission line 2 through an amplifier 3 of the stabilized negative feedback type to a receiver or other load 4. A pilot wave of constant average power from the single-frequency source 5, having a frequency falling outside of the signal band, is also transmitted over the line 2. The feedback path 6 between the output and the input of the amplifier 3 comprises a predistorter 7, a regulating network 8 including a thermo-responsive impedance element or thermistor 9, and a restorer 10 serially connected in the order named. An impedance-correcting network 11 may be inserted between the amplifier 3 and the load 4, if required.

The function of the amplifier 3 is to provide the required gain to compensate for the attenuation in the transmission line 2. However, the attenuation in the line varies continually because of fluctuations in the temperature, humidity, or other factors. Therefore, regulation must be provided. The pilot wave effects the required regulation through its action upon the thermistor 9.

Figure 8:
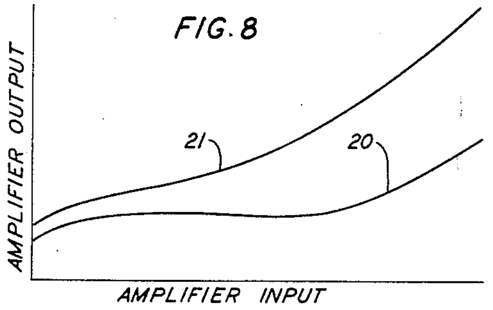
Fig. 8 shows typical input-output amplifier characteristics obtainable with the regulating system.

The regulating network 8 may, for example, be of the type disclosed in United States Patent No. 2,096,027, issued October 19, 1937, to H. W. Bode. Its attenuation-frequency characteristic is controlled by the resistance of the thermistor 9, which, in turn, depends upon the current flowing therethrough. This characteristic may be flat throughout the signal-frequency range, but it is ordinarily designed to have a frequency-dependent shape selected to compensate for the transmission changes in the line 2 which are to be corrected. It will be assumed that the resistance of the thermistor 9 and the attenuation of the network 8 both decrease with an increase of the current through the thermistor. Therefore, if a reduction in the line attenuation tends to increase the power output of the amplifier 3, the current traversing the thermistor increases but its resistance falls, thereby decreasing the attenuation in the feedback path 6 and the gain of the amplifier to reduce the output of the amplifier to substantially its original value. By similar action, an increase in the line attenuation will result in a compensating increase in the amplifier gain, thus again holding the amplifier output to substantially its original value. The regulating network 8 and the thermistor 9 are designed so that the amplifier output power remains substantially constant for a wide range of variation of the input power. Curve 20 of Fig. 8 is a typical input-output characteristic obtainable with the regulator shown in Fig. 1, using an amplifier having a comparatively small maximum power output.

If the frequency-selective network 7 is omitted from the regulating system shown in Fig. 1, it is apparent that the thermistor 9 will be traversed not only by the pilot current but also by the signal currents. This signal power will add to the pilot wave power dissipated in the thermistor and affect the regulation of the amplifier gain. Because the signal power ordinarily fluctuates rapidly and also varies as the number of channels in operation changes, its effect on the regulation will vary with signal load. In accordance with the present invention, this interference from the signal currents is greatly reduced or substantially eliminated by adding the predistorter 7, which freely passes the pilot frequency but discriminates strongly against the signal currents. In this way, all but a small part of the signal power is kept out of the thermistor 9 and the gain of the amplifier 3 is controlled almost exclusively by the power of the pilot wave. The distortion in the amplifier gain-frequency characteristic caused by the predistorter 7 is compensated for by the restorer 10, which ordinarily has a loss characteristic substantially complementary to that of the predistorter but may have some other shape if an amplifier characteristic other than flat is desired.

It is to be understood, of course, that on long transmission lines additional regulating amplifiers may be required. These may be inserted between the network 11 and the receiver 4, as indicated by the broken line 12.

Figure 2:
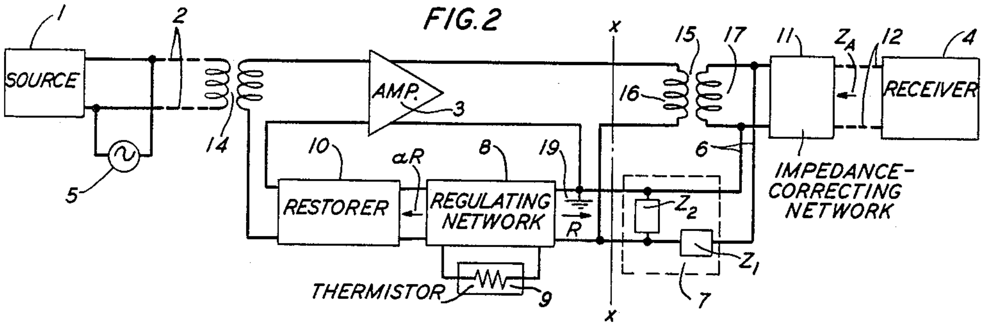
Fig. 2 is a schematic circuit showing the system of Fig. 1 in greater detail.

Fig. 2 shows the system of Fig. 1 in greater detail. The amplifier 3 is connected to the line 2 through an input transformer 14 and to the impedance-correcting network 11 and the line 12 through an output transformer 15 which has a plate winding 16 and a line winding 17. The ratio of the windings 16 and 17 is primarily chosen to step up the impedance of the line connected to the winding 17 to a proper value for deriving maximum power output from the output tube of the amplifier 3. However, the fact that the networks 7, 8, and 10 in the feedback path 6 also derive power from the amplifier 3 may influence somewhat the choice of this turns ratio.

The design of the regulating network 8 is facilitated, and its performance improved, if the network operates between purely resistive impedances. Therefore, the predistorter 7 preferably presents a constant, non-reactive impedance R at the end facing the regulating network, and the restorer 10, at its end facing the regulating network, preferably presents an impedance $aR$ of similar type which may or may not be equal to R, as indicated by the labelled arrows. For best operation of the regulating network 8, the sum of the terminal impedances R and $aR$ may, in a practical case, be of the order of 1000 ohms. The predistorter 7 is preferably provided with an impedance step-up from left to right so that the impedance shunting the line will be high enough to avoid diverting an undue amount of power from the load while at the same time the impedance R presented to the regulating network 8 will be sufficiently low for satisfactory regulation.

As shown, the predistorter 7 comprises a series impedance branch $Z_1$ and a shunt impedance branch $Z_2$. The branch $Z_1$ is connected between the lower end of the winding 16 and the upper end of the winding 17 of the transformer 15, and these windings are poled to be series aiding for this connection. The branch $Z_2$ is connected between the lower end of the winding 16 and ground, shown at 19.

Figure 3:
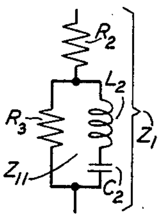

Fig. 3 shows a typical circuit suitable for the series impedance branch $Z_1$, comprising a resistance of value $R_2$ in series with an impedance $Z_{11}$. The impedance $Z_{11}$ consists of a resistance $R_3$ shunted by the series combination of an inductance $L_2$ and a capacitance $C_2$. In order that the predistorter 7 will transmit freely the pilot frequency $f_p$, the values of $L_2$ and $C_2$ are so chosen that these elements resonate at that frequency, and therefore $$L_2C_2=1/(2\pi f_p)^2 \qquad (1)$$

The value of the inductance $L_2$ is made large enough to secure the desired width of transmission band, which decreases as $L_2$ is increased. Also, the discrimination at the edge of the signal band adjacent to the pilot frequency improves as the ratio of $L_2$ to $C_2R_3^2$ is increased. The ratio of the resistance $R_3$ to the resistance $R_2$ is chosen to provide the desired loss over the signal band which is to be excluded from the regulating network 8. This loss increases as the ratio is increased. The sum of the resistances $R_2$ and $R_3$, chosen to provide the desired impedance facing the transformer 15, may be found from the formula $$R_2+R_3=\frac{K}{K-1}Z_L \qquad (2)$$

in which $$K=\frac{n_{16}+n_{17}}{n_{16}} \qquad (3)$$

$n_{16}$ is the number of turns on the winding 16 of the output transformer 15, $n_{17}$ is the number of turns on the winding 17, and $Z_L$ is the approximate value of the resistive component of the impedance of the line 12 as viewed from the network 11. Thus, the values of all of the elements in the branch $Z_1$ have been determined.

The shunt branch $Z_2$ is added to the predistorter 7 in order to make the impedance R looking into the left-hand end a pure resistance. Its magnitude is given by the expression $$R=R_2/K \qquad (4)$$

Figure 4:
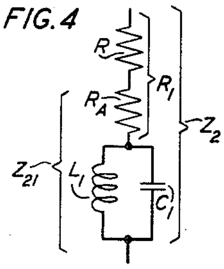
Figs. 3 and 4 are schematic circuits of impedance branches suitable, respectively, for use as the series branch $Z_1$ and the shunt branch $Z_2$ shown in Figs. 2 and 7.

As shown in Fig. 4, this branch comprises a resistance of value R in series with an impedance $Z_{21}$, consisting of a resistance $R_A$ in series with the parallel combination of a capacitance $C_1$ and an inductance $L_1$. The impedance $Z_{21}$ is inverse with respect to the impedance $Z_{11}$ in the $Z_1$ branch and, therefore $$Z_{11}Z_{21}=KR^2 \qquad (5)$$

so the values of elements $R_A$, $C_1$, and $L_1$ may be found from the relationships $$R_AR_3=L_2/C_1=L_1/C_2=KR^2 \qquad (6)$$

The resistances R and $R_A$ may, if desired, be combined into a single resistance $R_1$ of value $$R_1=R+R_A \qquad (7)$$

The values of all of the elements in the branch $Z_2$ have thus been determined.

Figure 5:
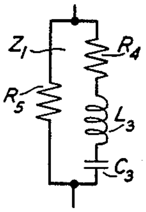
Fig. 5 shows an equivalent circuit for the impedance branch $Z_1$ of Fig. 3.

Fig. 5 shows an impedance branch which is equivalent to the one shown in Fig. 3 and is to be preferred in some cases. The circuit comprises a resistance $R_5$ shunted by the series combination of a resistance $R_4$, an inductance $L_3$, and a capacitance $C_3$. For equivalence of the two circuits, the following relationships must hold:

$$R_5=R_2+R_3 \qquad (8)$$

$$R_4=R_2R_5/R_3 \qquad (9)$$

$$C_3=C_2(R_3/R_5)^2 \qquad (10)$$

$$L_3=L_2(R_5/R_3)^2 \qquad (11)$$

In the circuit of Fig. 5, since the resistance $R_4$ is in series with the inductance $L_3$, part or all of this resistance may be included in the inductor which furnishes the inductance $L_3$. Thus, under some circumstances, a separate resistor to furnish the resistance $R_4$ is not required.

In order to prevent undesired reflections, it is desirable that the impedance $Z_A$, indicated on Fig. 2, looking back into the amplifier 3 from the left end of the line 12 should match the impedance $Z_B$ looking into the line 12 at this end. The impedance-correcting network 11 is added for this purpose. For the system shown in Fig. 2, in which the line winding 17 of the output transformer 15 is grounded on the lower side, the network 11 may be a two-terminal impedance branch of impedance $Z_C$, connected in series between the high side of the line 12 and the upper end of the winding 17. The impedance $Z_A$ will then be given by $$Z_A=Z_C+Z_1(K-1)/K \qquad (12)$$

Figure 6:
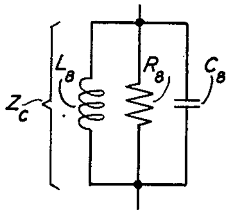
Fig. 6 is a schematic circuit of an impedance-correcting network suitable for use in Fig. 2.

If the impedance $Z_C$ has the configuration shown in Fig. 6, comprising the parallel combination of a capacitance $C_8$, an inductance $L_8$, and a resistance $R_8$, the impedance $Z_A$ may be made a constant, pure resistance if the elements have the following values in terms of the values of the element constituting $Z_{11}$:

$$R_3R_8=L_8/C_2=L_2/C_8=R_3^2(K-1)/K \qquad (13)$$

If the impedance $Z_B$ has a reactive component, the desired impedance match may be obtained by modifying the values of $C_8$ and $L_8$ or by adding properly chosen reactive elements to the network 11.

As mentioned above, the restorer 10 preferably presents a constant-resistance impedance $a$R at its end facing the regulating network 8, and it may have the same impedance at its other end. A suitable circuit of the bridged-T type is disclosed in United States Patent No. 1,606,817, issued November 16, 1926, to G. H. Stevenson. Other suitable types of circuits may, of course, be used if desired. The restorer 10 has a transmission characteristic substantially complementary to that of the predistorter 7 so that the over-all transmission characteristic of the feedback path 6, except for a constant flat loss, is only that introduced by the regulating network 8.

Figure 7:
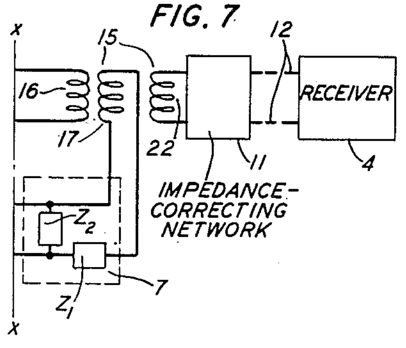
Fig. 7 shows the output portion of the system of Fig. 2 modified by the addition of a third winding to the output transformer.

Fig. 7 shows how the portion of the regulating system of Fig. 1 to the right of the line X—X may be modified to introduce an additional impedance-transforming factor. The line 12 to the receiver 4, instead of being connected to the winding 17 of the output transformer 15, is connected to an additional winding 22 which is inductively coupled to both of the windings 16 and 17. In this case, the elements $C_8$, $L_8$, and $R_8$ of the impedance $Z_C$ are replaced, respectively, by modified elements $C_8'$, $L_8'$, and $R_8'$, the values of which may be found from the following relationships:

$$R_8'/R_8=L_8'/L_8=C_8/C_8'=(n_{22}/n_{17})^2 \qquad (14)$$

where $n_{22}$ is the number of turns on the winding 22. If the receiver 4 is balanced to ground, the impedance $Z_C$ is preferably divided into two impedances, each equal to $Z_C/2$, which are connected in series, one on each side of the line 12, between the left end thereof and the winding 22 to constitute the impedance-correcting network 11.

Either of the circuits shown in Figs. 2 and 7 may be modified by making the series impedance branch $Z_1$ a single resistance approximately equal to the sum of $R_2$ and $R_3$ and replacing the shunt impedance $Z_2$ by a four-terminal network which has a constant-resistance image impedance at each end approximately equal to $(R_2+R_3)/K$ and a transmission characteristic similar to the one described above for the predistorter 7. In this case, the impedance-correcting network 11 may be eliminated, unless it is required in order to provide a reactive component to match the impedance $Z_B$. A typical input-output characteristic obtainable with this modified regulating system, using an amplifier of small maximum power output capability, is shown in Fig. 8 by curve 21 which, it will be noted, is less flat than curve 20.

It is to be understood that the above-described arrangements are illustrative of the application of the principles of the invention. Numerous other arrangements may be devised by those skilled in the art without departing from the spirit and scope of the invention.

What is claimed is:

1. In a signal transmission system in which transmission regulation is controlled by a pilot wave, an amplifier having a feedback path, a predistorter and a restorer connected in tandem in said feedback path, and a regulating network interposed between said predistorter and said restorer, said predistorter having a transmission characteristic which passes the pilot wave but discriminates against other frequencies, said restorer having a transmission characteristic substantially complementary to that of said predistorter, and said regulating network including a thermo-responsive impedance element which controls the attenuation characteristic of said regulating network in accordance with the current flowing in said element, whereby the gain of said amplifier is regulated in accordance with the amplitude of said pilot wave.

2. A system in accordance with claim 1 in which said restorer presents, at the end facing said regulating network, a substantially constant and substantially non-reactive impedance.

3. A system in accordance with claim 1 in which said predistorter provides an impedance transformation.

4. A system in accordance with claim 1 in which said predistorter provides an impedance step-up from its end facing said regulating network to its other end.

5. A system in accordance with claim 1 in which said predistorter presents, at the end facing said regulating network, a substantially constant and substantially non-reactive impedance.

6. A system in accordance with claim 5 in which said restorer presents, at the end facing said regulating network, a substantially constant and substantially non-reactive impedance.

7. A system in accordance with claim 5 in which said predistorter provides an impedance transformation.

8. A system in accordance with claim 5 in which said predistorter provides an impedance step-up from its end facing said regulating network to its other end.

9. A system in accordance with claim 1 which includes an output transformer associated with said amplifier.

10. A system in accordance with claim 9 in which said transformer comprises a plate winding and a second winding inductively coupled thereto.

11. A system in accordance with claim 10 in which said transformer includes a third winding inductively coupled to said plate winding and to said second winding.

12. A system in accordance with claim 10 in which said predistorter comprises a series impedance branch connected between the low side of said plate winding and the high side of said second winding.

13. A system in accordance with claim 12 in which said transformer includes a third winding inductively coupled to said plate winding and to said second winding.

14. A system in accordance with claim 12 in which said impedance branch includes the series combination of a capacitance and an inductance which are resonant at approximately the frequency of said pilot wave.

15. A system in accordance with claim 14 in which said impedance branch includes a resistance connected in parallel with said capacitance and said inductance.

16. A system in accordance with claim 15 in which said impedance branch includes a series resistance.

17. A system in accordance with claim 12 in which said predistorter comprises a shunt impedance branch proportioned with respect to said series impedance branch to make the impedance presented by said predistorter, at its end facing said regulating network, substantially constant and substantially non-reactive.

18. A system in accordance with claim 1 in which said predistorter comprises a series impedance branch and a shunt impedance branch, said branches being proportioned to make the impedance presented by said predistorter, at its end facing said regulating network, substantially constant and substantially non-reactive.

19. A system in accordance with claim 18 in which said series impedance branch includes at least two resistances.

References Cited in the file of this patent

UNITED STATES PATENTS

| Number | Name | Date |
|---|---|---|
| 2,096,027 | Bode | Oct. 19, 1937 |